United States Patent [19]
Ennamorato et al.

[11] Patent Number: 5,400,541
[45] Date of Patent: Mar. 28, 1995

[54] TEPEE TENT FOR A TRIPOD TREE STAND

[76] Inventors: Anthony Ennamorato; Pamela Ennamorato, both of 3615 Alexandria Dr., Arlington, Tex. 76015

[21] Appl. No.: 261,177

[22] Filed: Jun. 13, 1994

[51] Int. Cl.⁶ .................................. A01M 31/02
[52] U.S. Cl. .................................. 43/1; 47/21; 135/100; 135/901
[58] Field of Search ............. 135/901, 99, 100, 96, 135/900, 902, 87, 118; 47/21; 43/1

[56] References Cited

U.S. PATENT DOCUMENTS

| | | | |
|---|---|---|---|
| 396,846 | 1/1889 | Ancel | 135/100 |
| 1,711,843 | 5/1929 | Hammond | 47/21 |
| 3,042,052 | 7/1962 | Des Rosier | 135/100 |
| 3,220,766 | 11/1965 | Kates | 135/901 |
| 3,878,643 | 4/1975 | Greenman et al. | 47/21 |
| 3,967,694 | 7/1976 | Woolfolk, Sr. | 135/901 |
| 4,274,508 | 6/1981 | Hughes et al. | 135/901 |
| 4,364,193 | 12/1982 | Visco | 135/901 |
| 5,327,993 | 7/1994 | Stark, Sr. | 135/901 |

Primary Examiner—Ramon S. Britts
Assistant Examiner—Joanne C. Downs

[57] ABSTRACT

A tepee tent for a tripod tree stand comprising of a tree stand having a post constituting a center platform support with a lower end and having an elevated upper end, an upper platform positionable in a horizontal orientation and secured adjacent to the upper end of the post, a chair formed of a backrest and seat mounted to the post above the upper surface of the platform, a tent in the form of a tepee formed with a plurality of side walls having lower large edges coupled together positioned on the ground and having upper edges coupled together beneath the upper platform and having a base coupled at its edges to the lower edges of the side walls, the side and base being coupled together at their adjacent edges to form a shelter, and a door formed into one of the side walls adjacent to the base for allowing an entrance and an egress to the space within the shelter space.

5 Claims, 4 Drawing Sheets

TEPEE TENT FOR A TRIPOD TREE STAND

BACKGROUND OF THE INVENTION

1. Field of the Invention

The present invention relates to a tepee tent for a tripod tree stand and more particularly pertains to providing shelter for hunters and the like through a tent in the form of a tepee positioned about the center platform support.

2. Description of the Prior Art

The use of tents and other shelters of wide varieties of designs and configurations is known in the prior art. More specifically, tents end other shelters of wide varieties of designs and configurations heretofore devised and utilized for the purpose of sheltering hunters, outdoors people and others involved in outdoor activities through the use of tents and other shelters of various designs and configurations are known to consist basically of familiar, expected, and obvious structural configurations, notwithstanding the myriad of designs encompassed by the crowded prior art which has been developed for the fulfillment of countless objectives and requirements.

By way of example, the prior art discloses in U.S. Pat. No. 4,838,293 to Novak a tepee tent.

U.S. Pat. No. 4,838,292 to Allen discloses a tepee structure.

U.S. Pat. No. 4,699,248 to Roy discloses a collapsible and portable observation stand.

U.S. Pat. No. 4,674,598 to Sides discloses a single pole hunting stand.

U.S. Pat. No. 4,274,508 to Hughes discloses an outlook ladder seat.

In this respect, the tepee tent for a tripod tree stand according to the present invention substantially departs from the conventional concepts and designs of the prior art, and in doing so provides an apparatus primarily developed for the purpose of providing shelter for hunters and the like through a tent in the form of a tepee positioned about the center platform support.

Therefore, it can be appreciated that there exists a continuing need for a new and improved tepee tent for a tripod tree stand which can be used for providing shelter for hunters and the like through a tent in the form of a tepee positioned about the center platform support. In this regard, the present invention substantially fulfills this need.

SUMMARY OF THE INVENTION

In view of the foregoing disadvantages inherent in the known types of tents and other shelters of wide varieties of designs and configurations now present in the prior art, the present invention provides an improved tepee tent for a tripod tree stand. As such, the general purpose of the present invention, which will be described subsequently in greater detail, is to provide a new and improved tepee tent for a tripod tree stand and method which has all the advantages of the prior art and none of the disadvantages.

To attain this, the present invention essentially comprises a tepee tent for a tripod tree stand comprising of a tree stand having a post constituting a center platform support with a lower end positioned in the ground and having an elevated upper end, an upper platform positionable in a horizontal orientation and secured adjacent to the upper end of the post, a chair formed of a backrest and seat mounted to the post above the upper surface of the platform, a tent in the form of a tepee formed with three generally triangular side walls having lower large edges coupled together positioned on the ground and having upper small edges coupled together beneath the upper platform and having a triangular base coupled at its edges to the lower edges of the side walls, the side and base being coupled together at their adjacent edges to form a tepee shaped shelter, a lower platform positionable on the ground beneath the base, a pair of doors of fabric material secured into one of the side walls adjacent to the base for allowing an entrance and an egress to the space within the shelter, a pair of ladder hooks secured to the lower surface of the upper platform with associated hooks secured to the upper surface of the lower platform adjacent to one edge of the shelter, a ladder having hooks at its upper end for securement to the hooks of the upper platform and having hooks at the lower end for securement to the hooks on the lower platform, a plurality of dampers formed in the upper platform to allow the retention and exhaust of heated air between the space within the shelter and the chair, and a plurality of retention tabs with apertures located at each corner of the base with associated stakes for securement thereof to the ground when the shelter is in a deployed orientation.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent of legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved tepee tent for a tripod tree stand which have all the advantages of the prior art tents and other shelters of wide varieties of designs and configurations and none of the disadvantages.

It is another object of the present invention to provide a new and improved tepee tent for a tripod tree stand which may be easily and efficiently manufactured and marketed.

It is a further object of the present invention to provide a new and improved tepee tent for a tripod tree stand which is of durable and reliable constructions.

An even further object of the present invention is to provide a new and improved tepee tent for a tripod tree stand which is susceptible of a low cost of manufacture with regard to both materials and labor, and which accordingly is then susceptible of low prices of sale to the consuming public, thereby making such tepee tent for a tripod tree stand economically available to the buying public.

Still yet another object of the present invention is to provide a new and improved tepee tent for a tripod tree stand which provide in the apparatuses and methods of the prior art some of the advantages thereof while simultaneously overcoming some of the disadvantages normally associated therewith.

Still another object of the present invention is to provide shelter for hunters and the like through a tent in the form of a tepee positioned about the center platform support.

Lastly, it is an object of the present invention to provide a new and improved tepee tent for a tripod tree stand comprising of a tree stand having a post constituting a center platform support with a lower end and having an elevated upper end, an upper platform positionable in a horizontal orientation and secured adjacent to the upper end of the post, a chair formed of a backrest and seat mounted to the post above the upper surface of the platform, a tent in the form of a tepee formed with a plurality of side walls having lower large edges coupled together positioned on the ground and having upper edges coupled together beneath the upper platform and having a base coupled at its edges to the lower edges of the side walls, the sides and base being coupled together at their adjacent edges to form a shelter, and a door formed into one of the side walls adjacent to the base for allowing an entrance and an egress to the space within the shelter space.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
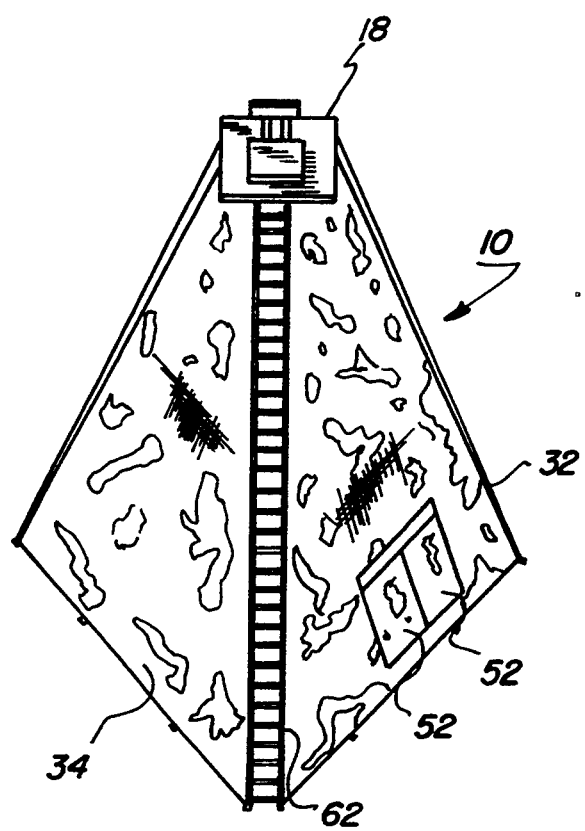
FIG. 1 is a perspective illustration of the preferred embodiment of the tepee tent for a tripod tree stand constructed in accordance with the principles of the present invention.
Figure 2:
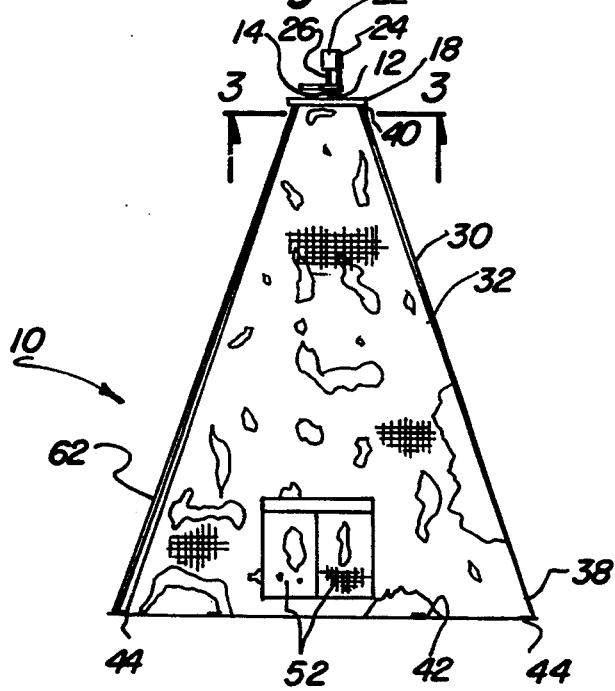
FIG. 2 is a front elevational view of the device illustrated in FIG. 1.
Figure 3:
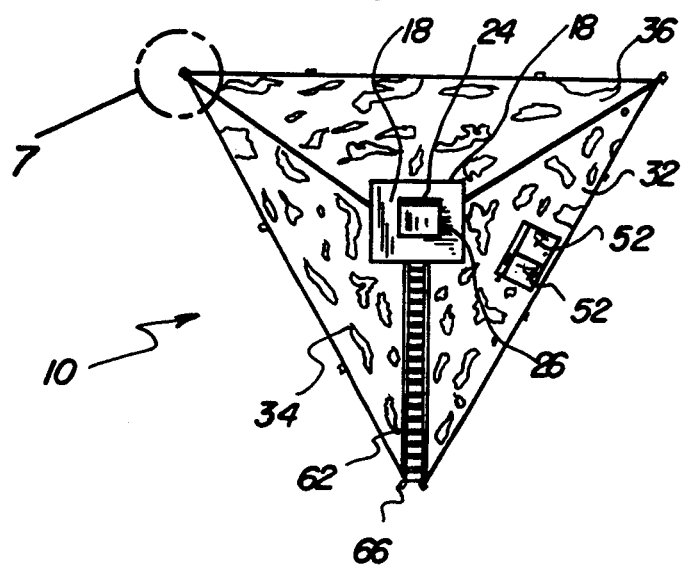
FIG. 3 is a top plan view of the device shown in FIGS. 1 and 2.
Figure 4:
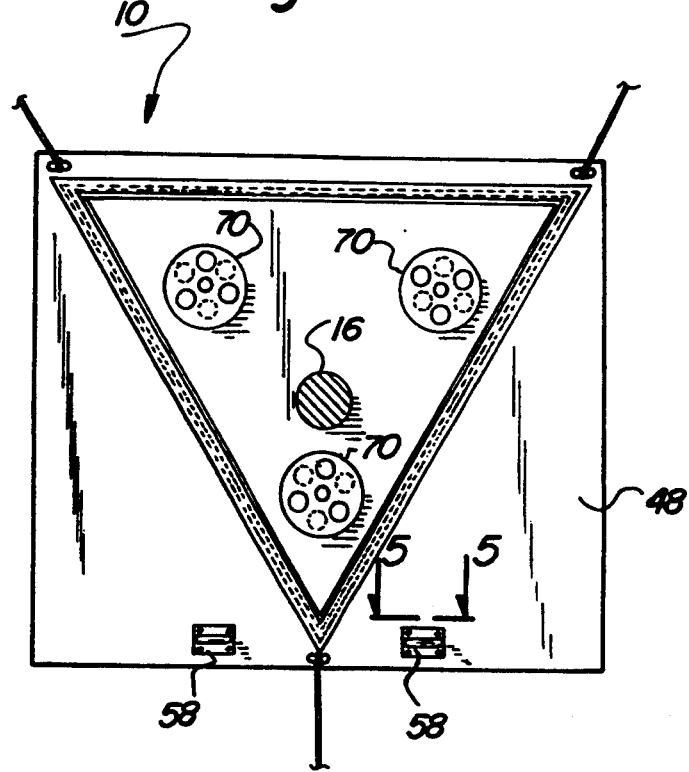
FIG. 4 is a cross-sectional illustration taken along line 3—3 of FIG. 2.
Figure 5:
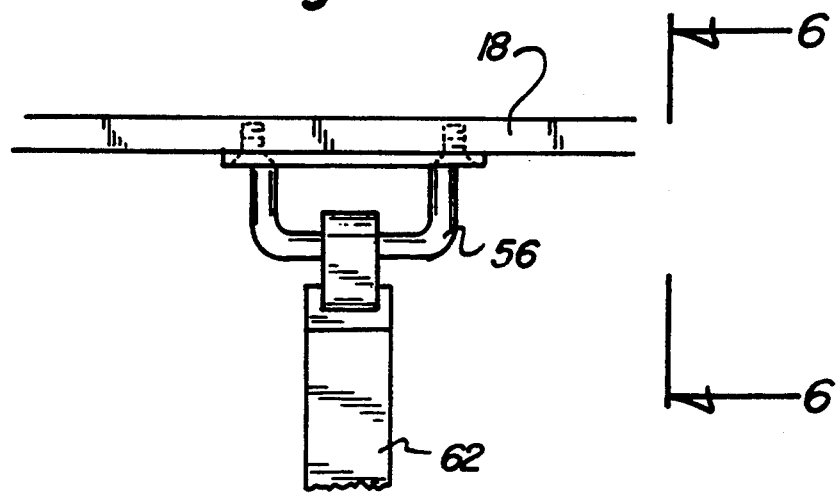
FIG. 5 is a cross-sectional view taken along line 5—5 of FIG. 4.
Figure 6:
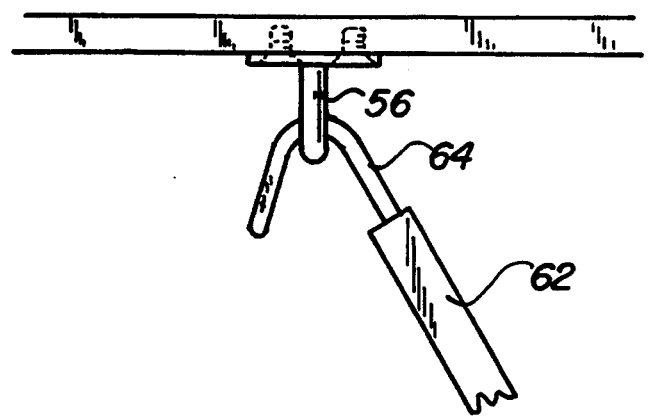
FIG. 6 is a cross-sectional view taken along line 6—6 of FIG. 5.
Figure 7:
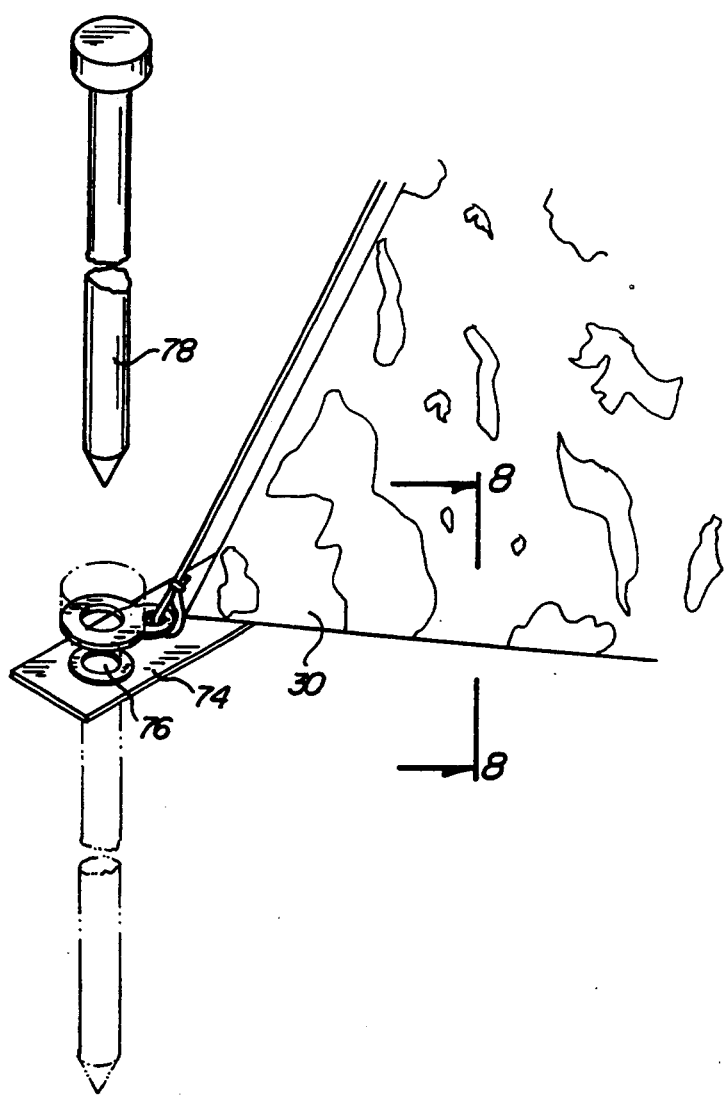
FIG. 7 is an exploded perspective illustration of one of the corners of the device of the prior figure.
Figure 8:
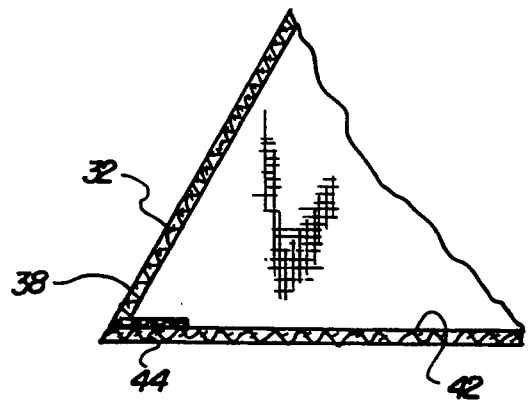
FIG. 8 is a cross-sectional view taken along line 8—8 of FIG. 7.

With reference now to the drawings, and in particular to FIG. 1 thereof, the preferred embodiment of the new and improved tepee tent for a tripod tree stand embodying the principles and concepts of the present invention and generally designated by the reference numeral 10 will be described.

The invention, the new and improved tepee tent for a tripod tree stand is comprised of a plurality of components. In their broadest context, such components include a post, an upper platform, a chair, a tent, a lower platform, doors, dampers, retention tabs and a ladder with hooks. Such components are specifically configured and correlated with respect to each other so as to attain the desired objective.

The present invention is a system 10. It has as its central component a post 12. The post constitutes a center platform support. It has a lower end 14 positioned in the ground and an elevated upper end 16. The function of the post is to support the upper platform 18. Such platform is positionable in a horizontal orientation. It is secured adjacent to the upper end of the post.

Secured to the upper end of the post is a chair 22. The chair is formed of a backrest 24 and a seat 26. The chair is mounted to the post above the upper surface of the upper platform.

The next component of the system is a tent 30. The tent is preferably shaped in the form of a tepee. It includes three generally triangular side walls 32, 34 and 36. Each side wall has lower large edges 38 coupled together and positioned on the ground. Each side wall also has upper smaller edges 40 coupled together beneath the platform 18. The tent also has a triangular base 42 coupled at its peripheral edges 44 to the lower edges of the side walls. The side wall and base are coupled together as by stitching at their adjacent edges to form a tepee shaped shelter.

Also provided as a component of the system 10 is a lower platform 48. Such lower platform is preferably positionable on the ground beneath the lower base 42.

Utility of the space within the tepee is enhanced by a pair of doors 52. The doors are preferably fabricated of a fabric material. They are secured into one or more of the sidewalls adjacent to the base. They allow for entrance and egress of users to the space within the shelter.

Next provided are a pair of ladder hooks 56. Such hooks are secured to the lower surface of the upper platform. They are used in association with associated hooks 58 secured to the upper surface of the lower platform at a location adjacent to one edge of the shelter. Between the hooks 56 and 58 is a ladder 62. The ladder has hooks 64 at its upper end for securement to the hooks of the upper platform. The ladder also has hooks 66 at the lower end for securement to the hooks on the lower platform.

Greater comfort is provided to the space within the shelter through a plurality of dampers 70. The dampers are formed in the upper platform to allow the retention and exhaust of heated air between the space within the shelter and the chair.

The last component of the system is a plurality of retention tabs 74. Such tabs are formed with apertures 76 rotated at each corner of the base. Associated therewith are stakes 78. The stakes function for securement of the retention tabs and tent to the ground when the shelter is in a deployed orientation.

One requisite for hunting during colder months is to provide suitable shelter. While a tree stand prevents the hunter from being seen and the human scent from being detected, it also exposes the body to the elements. Unfortunately most tree stands are not furnished with shelter, even those purchased from retail stores or through catalogs. What is needed is a lightweight tent that can be erected around the base of the tree stand, one that is constructed from durable materials to withstand long periods of use. That is why the present invention has been conceived. This invention is a tent with completely enclosed sides and a floor. It can be installed around tripod tree stands to provide shelter through the night.

The present invention is fabricated from weather resistant plastic in a basic pyramidal shape. The plastic is molded in camouflaged colors to limit its visibility. It features a zippered, waterproof door, and a hole in the top to help keep the chair area warmer. The sides of the material are secured to the ground using conventional tie down tools. It can be produced in various sizes to accommodate the different versions of the tree stands. The 15 foot stand can shelter 3 or more people, while the smaller version suits 1 or 2 persons.

The present invention can be easily set up using the same techniques as those used for any ordinary tent. The lightweight, plastic construction allows it to be easily carried over long distances.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A new and improved tepee tent for a tripod tree stand comprising, in combination:

a tree stand having a post constituting a center platform support with a lower and positioned in the ground and having an elevated upper end;

an upper platform having an upper surface and a lower surface positionable in a horizontal orientation and secured adjacent to the upper end of the post;

a chair formed of a backrest and seat mounted to the post above the upper surface of the platform;

a tent in the form of a tepee formed with three generally triangular side walls having lower large edges coupled together positioned on the ground and having upper small edges coupled together beneath the upper platform and having a triangular base coupled at its edges to the lower large edges of the side walls, the side walls and base being coupled together at their adjacent edges to form a tepee shaped shelter;

a lower platform having an upper surface and a lower surface positionable on the ground beneath the base;

a pair of doors of fabric material secured into one of the side walls adjacent to the base for allowing an entrance and an egress to the space within the shelter;

a pair of ladder hooks secured to the lower surface of the upper platform with associated hooks secured to the upper surface of the lower platform adjacent to one edge of the shelter;

a ladder having an upper end and a lower end and having hooks at the upper end for securement to the hooks of the upper platform and having hooks at the lower end for securement to the hooks on the lower platform;

a plurality of dampers formed in the upper platform to allow the retention and exhaust of heated air between the space within the shelter and the chair; and a plurality of retention tabs with apertures located at each corner of the base with associated stakes for securement thereof to the ground when the shelter is in a deployed orientation.

2. A tepee tent for a tripod tree stand comprising:

a tree stand having a post constituting a center platform support with a lower end and having an elevated upper end;

an upper platform having an upper surface and a lower surface positionable in a horizontal orientation and secured adjacent to the upper end of the post;

a chair formed of a backrest and seat mounted to the post above the upper surface of the platform;

a tent in the form of a tepee formed with a plurality of side walls having lower large edges coupled together positioned on the ground and having upper edges coupled together beneath the upper platform and having a base coupled at its edges to the lower large edges of the side walls, the side walls and base being coupled together at their adjacent edges to form a shelter; and a door formed into one of the side walls adjacent to the base for allowing an entrance and an egress to the space within the shelter space.

3. The apparatus as set forth in claim 2 and further including:

a ladder having an upper end and a lower end and having hooks at the upper end for securement to hooks on the upper platform and having hooks at the lower end for securement to hooks on the lower platform.

4. The apparatus as set forth in claim 2 and further including:

a plurality of dampers formed in the upper platform to allow the retention and exhaust of heated air between the space within the shelter and the chair.

5. The apparatus as set forth in claim 2 and further including:

a plurality of retention tabs with apertures located at each corner of the base with associated stakes for securement thereof to the ground when the shelter is in a deployed orientation.

* * * * *